US007268329B1

(12) United States Patent
VanDromme

(10) Patent No.: US 7,268,329 B1
(45) Date of Patent: Sep. 11, 2007

(54) LIGHTING SYSTEM

(76) Inventor: James R. VanDromme, 7428 Ansley La. Club Lake, Hillsdale, MI (US) 49242

( * ) Notice: Subject to any disclaimer, the term of this patent is extended or adjusted under 35 U.S.C. 154(b) by 0 days.

(21) Appl. No.: 11/336,191

(22) Filed: Jan. 23, 2006

(51) Int. Cl.
*G01J 1/21* (2006.01)
*F21V 3/00* (2006.01)

(52) U.S. Cl. ........................ 250/205; 362/363; 362/806

(58) Field of Classification Search ................ 250/205; 362/363, 800, 806
See application file for complete search history.

(56) References Cited

U.S. PATENT DOCUMENTS 2,339,385 A 1/1944 Duplor
3,662,381 A 5/1972 Steffens
3,873,880 A * 3/1975 Riddell ........................ 315/53
D370,288 S 5/1996 Tognu
5,558,421 A 9/1996 Guastella
5,639,157 A * 6/1997 Yeh ........................ 362/567
6,644,834 B2 11/2003 Christen
6,769,794 B2 8/2004 Huang
6,827,466 B2 * 12/2004 Tsai ........................ 362/231

* cited by examiner

*Primary Examiner*—John R. Lee

(57) ABSTRACT

A lighting system for providing a selection of different colors of light and a desired duration that the light remains on includes a light housing and a hook portion being attached together. The hook portion is configured to engage the support surface and suspend the light housing from the support surface. Each of a plurality of light emitters is coupled to the light housing. Each of the light emitters is configured to emit a color of light different than other ones of the light emitters. A globe is couplable to the light housing and extends over the light emitters. A control assembly is operationally couplable to the light emitters. The control assembly is configured to engage a power source. The control assembly controls which of the light emitters is energized and a duration the light emitters are energized.

11 Claims, 5 Drawing Sheets

LIGHTING SYSTEM

BACKGROUND OF THE INVENTION

1. Field of the Invention

The present invention relates to decorative lamps and more particularly pertains to a new decorative lamp for providing a selection of different colors of light and a desired duration that the light remains on.

2. Description of the Prior Art

The use of decorative lamps is known in the prior art. U.S. Pat. No. 6,769,794 describes a device for holding a single light bulb with a decorative soft cover positioned around the light bulb to allow the light bulb to illuminate the soft cover from the inside. Another type of decorative lamp is U.S. Pat. No. 3,662,381, which provides a plurality of lamps in a resinous mass to allow light from the lamps to illuminate the resinous mass. Another type of decorative lamp is U.S. Pat. No. 5,558,421 which positions a plurality of fiber optic strands in a lamp shade to illuminate the lamp shade.

While these devices fulfill their respective, particular objectives and requirements, the need remains for a system that has certain improved features allowing for a color emitted by light emitters to be selected as well as the duration that the light emitters are energized.

SUMMARY OF THE INVENTION

The present invention meets the needs presented above by generally comprising a light housing and a hook portion being attached together. The hook portion is configured to engage the support surface and suspend the light housing from the support surface. Each of a plurality of light emitters is coupled to the light housing. Each of the light emitters is configured to emit a color of light different than other ones of the light emitters. A globe is couplable to the light housing and extends over the light emitters. A control assembly is operationally couplable to the light emitters. The control assembly is configured to engage a power source. The control assembly controls which of the light emitters is energized and a duration the light emitters are energized.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
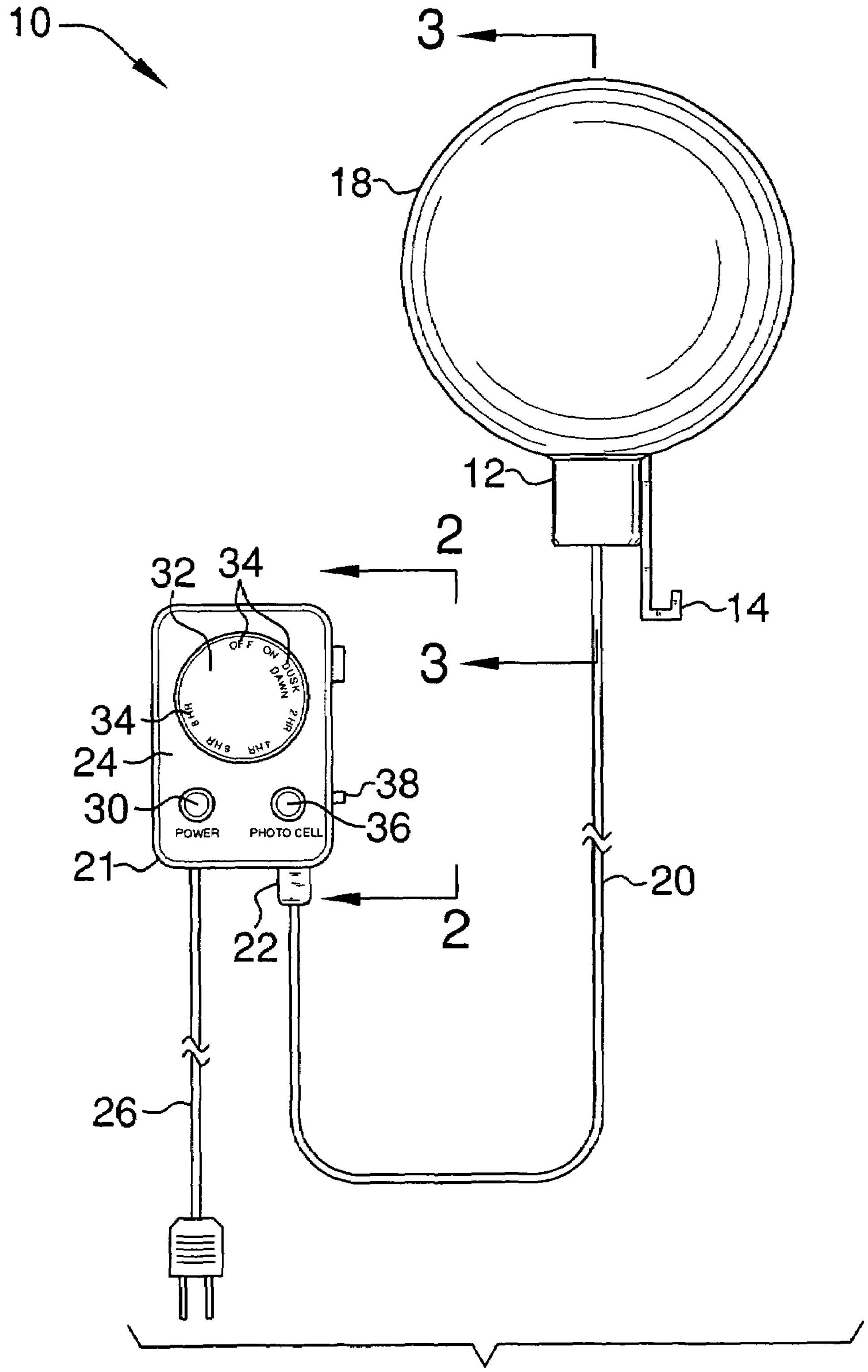
FIG. 1 is a front view of a lighting system accordingly to the present invention.
Figure 2:
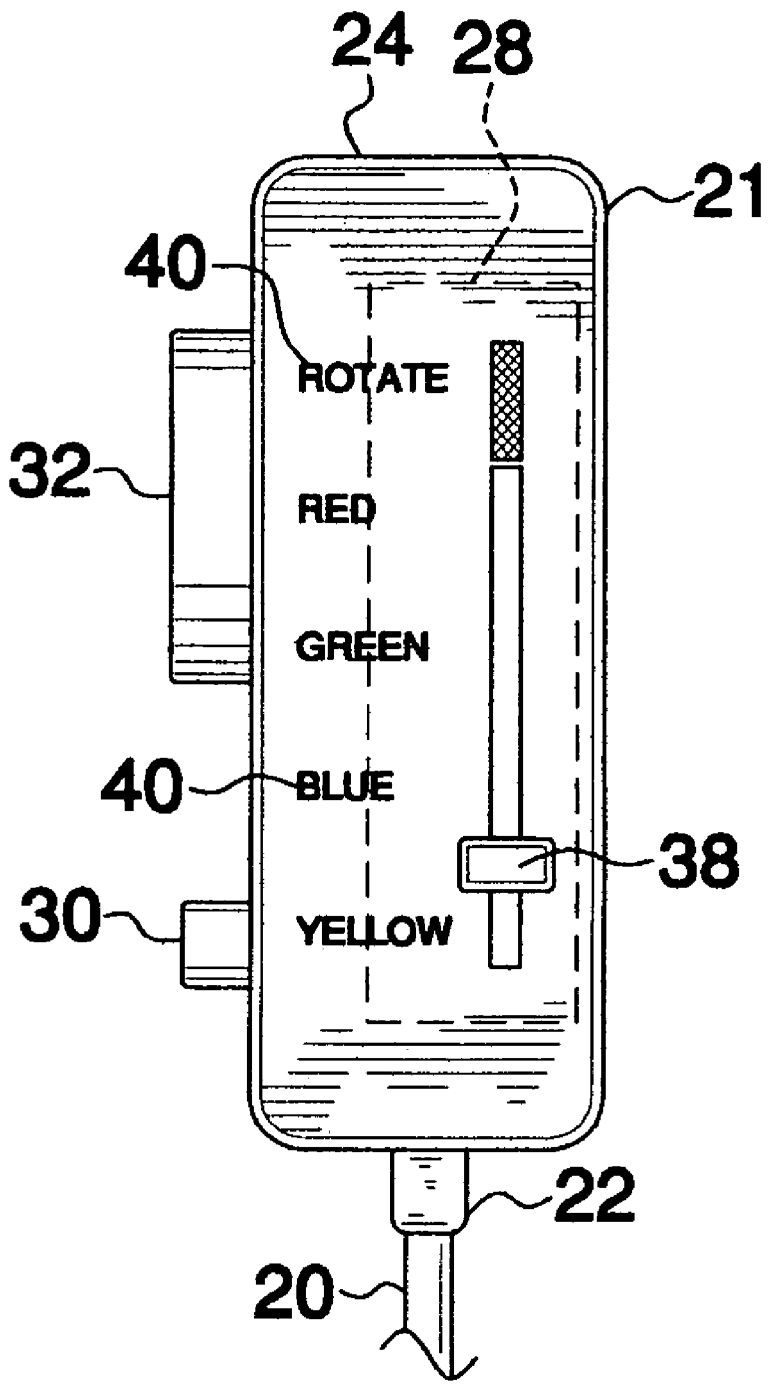
FIG. 2 is a side view of the control assembly of the present invention taken along line 2-2 of FIG. 1.
Figure 3:
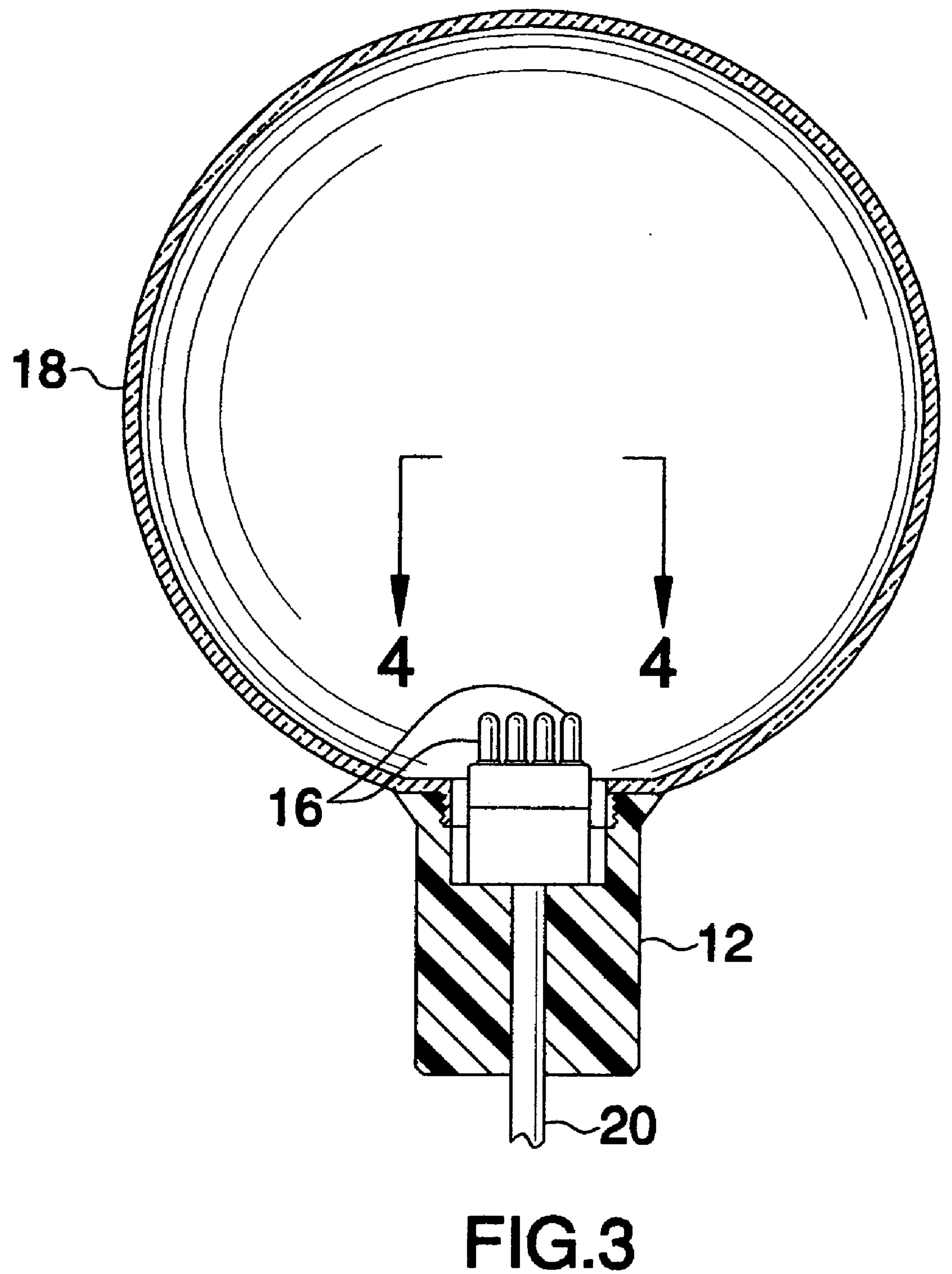
FIG. 3 is a cross sectional view of the present invention taken along line 3-3 of FIG. 1.
Figure 4:
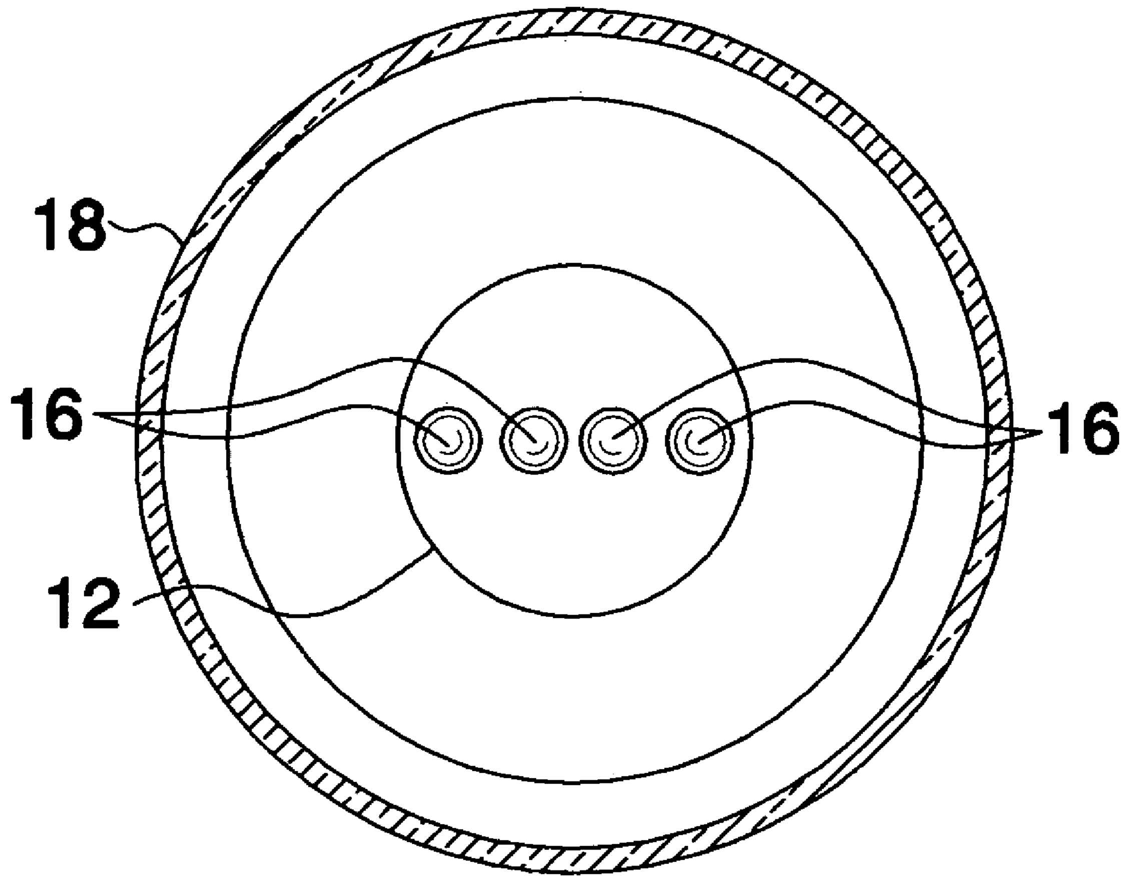
FIG. 4 is a cross-sectional view of the present invention taken along line 4-4 of FIG. 3.
Figure 5:
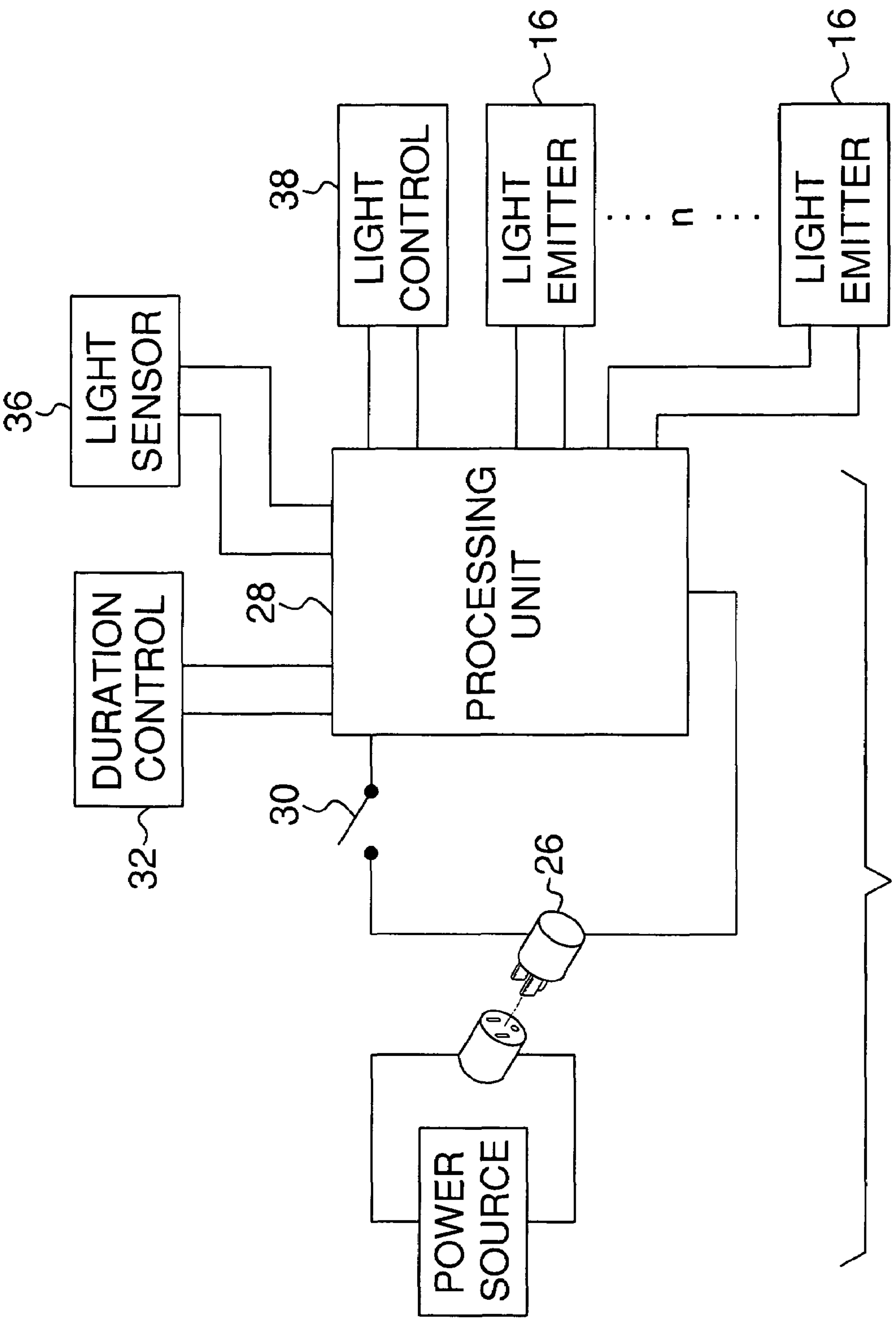
FIG. 5 is a schematic view of the control assembly and the light emitters of the present invention.

With reference now to the drawings, and in particular to FIGS. 1 through 5 thereof, a new decorative lamp embodying the principles and concepts of the present invention and generally designated by the reference numeral 10 will be described.

As best illustrated in FIGS. 1 through 5, the lighting system 10 generally comprises a light housing 12 and a hook portion 14 being attached together. The hook portion 14 is configured to engage a support surface and suspend the light housing 12 from the support surface. Each of a plurality of light emitters 16 is coupled to the light housing 12. Each of the light emitters 16 is configured to emit a color of light different than other ones of the light emitters 16. A globe 18 is couplable to the light housing 12 and extends over the light emitters 16. The globe 18 inhibits the light emitters 16 from being damaged. The globe 18 comprises a translucent material to disperse light emitted from the light emitters 16. A control lead 20 extends through the light housing 12 and is electrically coupled to each of the light emitters 16. The control lead 20 transfers power to the light emitters 16 to energize the light emitters 16.

A control assembly 21 is couplable to a free end 22 of the control lead 20. The control assembly 21 is configured to engage a power source. The control assembly 21 controls which of the light emitters 16 is energized and a duration the light emitters 16 are energized. The control assembly 21 comprises a control housing 24 configured to protect the control assembly 21 from being inadvertently damaged. A power lead 26 is coupled to and extends outwardly from the control housing 24. The power lead 26 selectively engages the power source to transfer power to the control assembly 21. A processing unit 28 is positioned in the control housing 24 and is electrically coupled between the power lead 26 and the control lead 20 to selectively energize one of the light emitters 16 for a desired duration. A power switch 30 is coupled to the control housing 24. The power switch 30 is electrically coupled between the power lead 26 and the processing unit 28 to selectively turn the processing unit 28 on and off when the power switch 30 is actuated.

The control assembly 21 additionally includes a duration control 32 coupled to the control housing 24 that is electrically coupled to the processing unit 28. The duration control 32 actuates the processing unit 28 to set the desired duration that the light emitters 16 are to be energized when the duration control 32 is actuated. The duration control 32 has a plurality of duration settings 34. A plurality of the duration settings 34 indicates a different duration time than the others of the timer settings, such as 2 hours, 4 hours, 6 hours and 8 hours. One of the duration settings 34 actuates the processing unit 28 to discontinue energizing of the light emitters 16. One of the duration settings 34 actuates the processing unit 28 to energize one of the light emitters 16 until another one of the duration settings 34 is selected.

A light sensor 36 of the control assembly 21 is coupled to the housing. The light sensor 36 is electrically coupled to the processing unit 28. One of the duration settings 34 actuates the processing unit 28 to energize one of the light emitters 16 from dusk to dawn. The processing unit 28 turns on the light emitters 16 as configured by the duration control 32 when the light sensor 36 detects a lack of light engaging the light sensor 36.

Additionally the control assembly 21 includes a light control 38 coupled to the control housing 24. The light control 38 is electrically coupled to the processing unit 28 and actuates the processing unit 28 to control which of the light emitters 16 is energized by the processing unit 28 when the light control 38 is actuated. The light control 38 has a plurality of light settings 40. Each of the light settings 40 indicates a color of an associated one of the light emitters 16 to allow a desired color of light emitted to be selected when the light control 38 is actuated to one of the light settings 40. One of the light settings 40 of the light control 38 actuates the processing assembly to cycle through the light emitters 16 and thereby cycling through the colors of light emitted by the light emitters 16.

In use, the hook portion 14 is engaged to the support surface to allow the light housing 12 and globe 18 to be suspended from the support surface in a desired location. The power lead 26 is engaged to the power source. The duration control 32 is actuated to a desired one of the duration settings 34 and the light control 38 is actuated to the desired one of the light settings 40. As the light sensor 36 detects the lack of light the processing unit 28 is actuated to energize the light emitters 16 as selected with the light control 38 for desired duration as selected with the duration control 32.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lighting system for being suspended from a support surface, said system comprising:

a light housing and a hook portion being attached together, said hook portion being configured to engage the support surface and suspend said light housing from the support surface;

a plurality of light emitters, each of said light emitters being coupled to said light housing, each of said light emitters being configured to emit a color of light different than other ones of said light emitters;

a globe being couplable to said light housing and extending over said light emitters; and a control assembly being operationally couplable to said light emitters, said control assembly being configured to engage a power source, said control assembly controlling which of said light emitters is energized and a duration said light emitters are energized, said control assembly including a control housing;

a processing unit being positioned in said control housing and being in electrical communication with said light emitters, said processing unit selectively energizing one of said light emitters for a desired duration;

a duration control being coupled to said control housing and being electrically coupled to said processing unit, said duration control being actuatable to set the desired duration that said light emitters are to be energized when said duration control is actuated.

2. The system according to claim 1, wherein said globe comprises a translucent material to disperse light emitted from said light emitters.

3. The system according to claim 1, further comprising a control lead extending through said light housing and being electrically coupled to each of said light emitters, a free end of said control lead being couplable to said control assembly, said control lead transferring power to said light emitters to energize said light emitters.

4. The system according to claim 3, wherein said control assembly includes a power lead being coupled to and extending outwardly from said control housing, said power lead selectively engaging the power source to transfer power to said control assembly.

5. The system according to claim 4, wherein said control assembly includes a power switch being coupled to said control housing, said power switch being electrically coupled between said power lead and said processing unit to selectively turn said processing unit on and off when said power switch is actuated.

6. The system according to claim 1, wherein said duration control has a plurality of duration settings each indicating a different duration time each of said light emitters will be illuminated, one of said duration settings actuating said processing unit to discontinue energizing of said light emitters, one of said duration settings actuating said processing unit to energize one of said light emitters until another one of said duration settings is selected.

7. The system according to claim 6, wherein said control assembly includes a light sensor being coupled to said housing, said light sensor being electrically coupled to said processing unit, one of said duration settings actuating said processing unit to energize one of said light emitters from dusk to dawn, said processing unit turning on said light emitters as configured by said duration control when said light sensor detects a lack of light engaging said light sensor.

8. The system according to claim 1, wherein said control assembly includes a light control being coupled to said control housing, said light control being electrically coupled to said processing unit and actuating said processing unit to control which of said light emitters is energized by said processing unit when said light control is actuated.

9. The system according to claim 8, wherein said light control has a plurality of light settings, each of said light settings indicating a color of an associated one of said light emitters to allow a desired color of light emitted to be selected when said light control is actuated to one of said light settings.

10. The system according to claim 9, wherein one of said light settings of said light control actuating said processing assembly to cycle through said light emitters and thereby cycling through the colors of light emitted by said light emitters.

11. A lighting system for being suspended from a support surface, said system comprising:

a light housing and a hook portion being attached together, said hook portion being configured to engage the support surface and suspend said light housing from the support surface;

a plurality of light emitters, each of said light emitters being coupled to said light housing, each of said light emitters being configured to emit a color of light different than other ones of said light emitters;

a globe being couplable to said light housing and extending over said light emitters, said globe comprising a translucent material to disperse light emitted from said light emitters;

a control lead extending through said light housing and being electrically coupled to each of said light emitters, said control lead transferring power to said light emitters to energize said light emitters;

a control assembly being couplable to a free end of said control lead, said control assembly being configured to engage a power source, said control assembly controlling which of said light emitters is energized and a duration said light emitters are energized, said control assembly comprising:

a control housing;

a power lead being coupled to and extending outwardly from said control housing, said power lead selectively engaging the power source to transfer power to said control assembly;

a processing unit being positioned in said control housing, said processing unit being electrically coupled between said power lead and said control lead to selectively energize one of said light emitters for a desired duration;

a power switch being coupled to said control housing, said power switch being electrically coupled between said power lead and said processing unit to selectively turn said processing unit on and off when said power switch is actuated;

a duration control being coupled to said control housing and being electrically coupled to said processing unit, said duration control actuating said processing unit to set the desired duration that said light emitters are to be energized when said duration control is actuated;

a light sensor being coupled to said housing, said light sensor being electrically coupled to said processing unit, said processing unit turning on said light emitters as configured by said duration control when said light sensor detects a lack of light engaging said light sensor;

a light control being coupled to said control housing, said light control being electrically coupled to said processing unit and actuating said processing unit to control which of said light emitters is energized by said processing unit when said light control is actuated.

* * * * *